United States Patent [19]

Linick

[11] 4,453,087
[45] Jun. 5, 1984

[54] SCANNING MECHANISM FOR FLIR SYSTEMS

[76] Inventor: James Linick, 4611 San Miguel, Tampa, Fla. 33609

[21] Appl. No.: 286,768

[22] Filed: Jul. 27, 1981

[51] Int. Cl.³ .......................... H01J 31/49; G01J 1/00
[52] U.S. Cl. ...................................... 250/334; 250/347
[58] Field of Search .............. 250/330, 332, 334, 338, 250/347, 351; 350/6.2, 6.4; 356/16; 358/205

[56] References Cited

U.S. PATENT DOCUMENTS

| | | | |
|---|---|---|---|
| 1,647,631 | 11/1927 | Ives | 350/6.3 |
| 3,083,611 | 4/1963 | Ziolkowski et al. | 350/6.4 |
| 3,781,559 | 12/1973 | Cooper et al. | 250/334 |
| 3,813,552 | 5/1974 | Johnson | 250/351 |

Primary Examiner—Janice A. Howell
Attorney, Agent, or Firm—Stefan Stein

[57] ABSTRACT

A scanning mechanism for a fast framing thermal imaging system such as a FLIR is disclosed. The scanning mechanism comprises two prisms which are canted with respect to one another and positioned in front of the final image forming lens of the FLIR. The two prisms are precisely counter-rotated with respect to one another by a drive train assembly and motor means. An annular timing disc is positioned about one of the prisms to enable an optically sensitive transducer to sense the rotational position of the prisms. The counter-rotating prisms function to enable the detector array of the FLIR to dissect the thermal image in a 2:1 interlacing technique.

10 Claims, 4 Drawing Figures

SCANNING MECHANISM FOR FLIR SYSTEMS

BACKGROUND OF THE INVENTION

1. Field of the Invention

This invention relates to fast framing thermal imaging systems commonly referred to as Forward Locking Infra-Red systems. More particularly, this invention relates to the scanner mechanism of the thermal imaging system.

2. Description of the Prior Art

Presently there exist many thermal imaging systems designed to convert infrared radiation to visible radiation for viewing by an observer. The most common types of these thermal imaging systems are single framing thermographic cameras, downward looking single channel thermal mapping systems, and fast framing thermal imaging systems.

Fast framing thermal imaging systems comprise mechanically-scanning devices which convert radiation in the far infrared spectral region to visible radiation in real time and at an information rate (or frame rate) comparable to that of standard television. Such systems are commonly referred to as FLIR systems, the acronym for Forward Looking Infra-Red. Although the term FLIR originally implied an airborne system, it is now used to denote any fast framing thermal imager. Thermal imaging in a FLIR is produced by an optical system which collects, spectrally filters, and focuses the infrared scene radiation onto an optically scanned multi-element detector array. The elements of the detector array then convert the optical signals into analog electrical signals which are amplified and processed for display on a monitor such as a video monitor.

The function of the scanner mechanism in a FLIR is to move the image formed by the optical system in the plane of the detector array in such a way that the detectors dissect the image sequentially and completely. There are two basic types of scanners; a parallel beam scanner which consists of an optical angle changing device such as a moving mirror placed in front of the final image forming lens, and a converging beam scanner which consists of a moving mirror or other scanning device placed between the final lens and the image. The seven most commonly used optical scanning mechanisms include the oscillating mirror, the rotating polygonal mirror, the rotating refractive prism, the rotating wedge, the revolving lens, the rotating sensor, and the rotating V-mirror. One-dimensional or two-dimensional scanners may be implemented by various combinations of the above scanning mechanisms.

In addition to the distinctions between scanning mechanism types such as convergent and parallel beam scanning, and one- or two-dimensional scanning, there is a distinction between serial and parallel scene dissection and detector signal processing. In parallel scene dissection, an array of detectors is oriented perpendicular to the primary scan axis, as in a unidimensional detector array used with an azimuth scanner. All of the detector outputs are amplified, processed and displayed simultaneously or in parallel. In serial scene dissection, an array of detectors is oriented parallel to the primary scan access and each point of the image is scanned by all of the detectors. The detector outputs are then appropriately delayed and summed by an integrating delay line which superimposes the outputs, thereby simulating a single scanning detector, or they may be read out, one-for-one, on a similar array of scanning display elements such as LED elements. From the foregoing, it should be appreciated that there exist many different types of FLIRs, with the particular type of scanning selected being dependent upon such factors as overall allowed sensor size, allowed power consumption, and performance-to-cost ratio.

As an example, one of the simplest state-of-the-art FLIRs that attempts to optimize the above factors is a parallel scan parallel video system which requires only a collecting converging optic, a two-sided oscillating scanner, a detector array, amplifying electronics, display drivers, and an eyepiece. More particularly, in one specific embodiment of such a FLIR, the infrared energy from the viewed scene or target is received by an afocal, magnifying, infrared lens having a 3:1 step zoom capability. The recollimated beam from the afocal lens impinges upon the front surface of the scanner which reflects the infrared energy to the detector array. The outputs of the detector array are amplified and shaped to appropriately drive the visible light emitters, such as an LED array having a one-to-one correspondence to the individual elements of the detector array. The visible output from the LED array is then reflected off the back side of the scanner to a visible optic which magnifies and focuses the reflected visible scan for viewing by the observer.

The primary advantages to the above mentioned of a simple FLIR so that no scan synchronizer is needed to synchronize the thermal scan with the visible scan, the scanner requires a relatively low amount of power, and the display is compact. The minor disadvantages of the FLIR are that only one observer may observe the display, loss of any part of a channel causes loss of one line of video, all channels must be balanced individually, all channels must be controlled simultaneously (ganged), the channels may require d.c. restoration, and video waveform shaping must be performed in each channel. Fortunately, well-known electronic techniques have been developed to compensate for the above disadvantages.

The major disadvantages to the above described FLIR include the need for an oscillating scanner, the requirement for a large number of detector elements constituting the detector array, and the lack of reliable synchronization between the oscillating scanner and the sampling of the detector elements. More particularly, such oscillating scanners typically comprise a flat mirror which oscillates in the azimuthal direction enabling the detector array to sequentially dissect the thermal image. It should be appreciated that the mirror must scan in the azimuthal direction, stop, and then scan in the reverse azimuthal direction. Obviously, a high torque motor is required to almost instantaneously decelerate the angular velocity of the mirror at the end of the first frame, and then to almost instantaneously accelerate the mirror to scan the second frame to achieve a relatively constant rate of scan (dwell time). In actual practice, the dwell time cannot be held constant due to the fact that it is virtually impossible to instantaneously decelerate and accelerate the mirror. This results in a substantial amount of mechanical jitter in the scan which causes a substantial information delay at the output of the detectors. Moreover, the reverse scan in the opposite azimuthal direction typically accentuates such a delay by a factor of two thereby causing considerable blurring of the resultant picture. Appropriate phase shift techniques must therefore be provided to compensate for such a delay factor. It is noted that the amount of mechanical jitter associated with oscillatory mirror mechanisms is substantially increased when the FLIR is used in actual working conditions and environments. As a result, FLIRs are less rugged than would be normally desired. Additionally, the oscillatory mirror mechanism creates a great amount of microphonics which adversely affects the performance of the FLIR.

As noted earlier, another major disadvantage of the FLIR system described above is the requirement for a large number of detector elements which constitute the detector array. In order to completely dissect the thermal image, the individual detector elements must be vertically stacked immediately adjacent to one another. Present state-of-the-art manufacturing techniques have been unable to fabricate the detector elements adjacent to one another a distance no closer than 25 microns. This results in incomplete dissection of the thermal image. In order to compensate for the space between the detector elements, it has been found necessary to stagger a second vertical column of detector elements adjacent to the first row of detector elements. Obviously, such staggered arrays double the amount of detector elements (and also doubles the amount of associated electronics) needed to completely dissect the thermal image. It is well-known that the cost of the FLIR system increases at least parabolically in proportion to the amount of detector elements needed to completely dissect a thermal image. Moreover, the cost of a fully operable detector array increases dramatically when the individual detector elements are fabricated close to one another. This is due to the inability to repair by "cut and paste" techniques, inoperable detector elements of the detector array. Thus, the entire detector array must be scrapped in the event a single detector element is improperly fabricated or in the event a single detector element becomes inoperable during use.

Recently, it has been found that the amount of detector elements described above which are needed to completely dissect the thermal image can be reduced by one-quarter by using interlacing techniques. Specifically, in these improved FLIRs, a 2:1 interlace of the thermal image is accomplished by providing a means for tilting the oscillating mirror in a vertical (elevational) direction and by fabricating the detector array in a single vertical column with each detector element being spaced apart from its adjoining elements by a distance equal to its pel size. In operation, the 2:1 interlace scan of the thermal image is accomplished by scanning the mirror in an azimuthal direction to complete one field of the frame, pivoting the mirror in a vertical direction by a distance equal to the pel size of the detector elements, scanning the mirror in the reverse azimuthal direction to complete the second field of the frame, and then pivoting the mirror in the reverse vertical direction to complete one frame. It should be appreciated that such 2:1 interlacing techniques eliminate the need for a two column staggered detector array, thereby decreasing the number of detector elements needed to completely dissect the image by one-quarter. Unfortunately, the need for pivoting the mirror in a vertical direction in addition to the azimuthal direction doubles the inherent disadvantages to the oscillating mirror and results in a substantial amount of mechanical jitter in the vertical direction in addition to the azimuthal direction.

Finally, the third major disadvantage to the simplified FLIR and to the improved FLIR discussed above, is the difficulty of synchronizing the oscillating mirror with the rate in which the detector elements are sampled as the detector array dissects the thermal image. The only available method for synchronizing the oscillating mirror with the sampling rate is to incorporate a position transducer within the gimbal of the oscillating mirror which senses the completion of the scanning of each field. This information is then compared with an electronically generated position command, the difference of which is amplified to send corrective signals to the torque motors controlling the oscillation of the mirror. Obviously, inasmuch as the transducer is only able to sense the completion of the scanning of each field, there exists no method for synchronizing the sampling rate with any variation in the scan rate. Thus, as noted earlier, the detector elements cannot be linearly sampled in relation to the scanning of the thermal image.

Therefore it is an object of this invention to provide an apparatus and method which overcomes the aforementioned inadequacies of the prior art devices and provides an improvement which is a significant contribution to the advancement of the art of thermal imaging systems.

Another object of this invention is to provide an apparatus and method for scanning linear infrared detector arrays which eliminates mechanical jitter commonly associated with oscillatory scanning devices.

Another object of this invention is to provide an apparatus and method for scanning linear infrared detector arrays in which the thermal image is scanned onto the detector array in a smooth and continuous motion resulting in reduced microphonics and in a significantly more rugged FLIR, the performance of which is unaffected when he FLIR is used in less than favorable conditions and environments.

Another object of this invention is to provide an apparatus and method for scanning linear infrared detector arrays in such a manner that the frame of the image is sequentially and completely dissected by the detector array with a minimal amount of detector elements constituting the detector array to substantially reduce the cost of the FLIR while providing a greatly strengthened system.

Another object of this invention is to provide an apparatus and method for scanning linear infrared detector arrays by using 2:1 interlacing techniques which enable the individual detector elements to be spaced apart from one another a distance sufficient to facilitate repair of inoperable detector elements by "cut and paste" techniques thereby eliminating the need for scrapping the entire detector array when only one detector element is inoperable.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a scanning mechanism which may be incorporated within a fast framing thermal imaging system such as a FLIR. More particularly, the scanning mechanism of the invention comprises two prisms which are canted with respect to one another and positioned in front of the final image forming lens of the FLIR. The two prisms are precisely counterrotated with respect to one another by a drive train assembly and motor means. An annular timing disc is positioned about one of the prisms to enable an optically sensitive transducer to sense the rotational position of the prisms.

The counterrotating prisms function as a parallel beam scanner to move the image formed by the optical system of the FLIR in the plane of the detector array in such a way that the detector elements dissect the thermal image sequentially and completely. The detector array comprises a column of detector elements which are stacked apart from one another by a distance equal to their pel size. The parallel rays of radiation from the thermal image are refracted by the counterrotating prisms to produce an elliptical scan pattern. The index of refraction, the prism angle, and the angle of tilt of each prism are selected to produce an elliptical scan having two parallel lines which are separated by the pel size of the detector elements and which are substantially parallel over the majority of the total length of the elliptical scan. The elliptical scan pattern created by the counterrotating prisms and the separation of the detector elements of the detector array enables each frame of the thermal image to be dissected in two fields by 2:1 interlacing techniques.

The timing disc is provided to enable the output of the detector elements to be parallel sampled uniformly in relation to the rate of scan of each field of the frame. Inasmuch as the counterrotating prisms create a nonlinear rate of scan over the active field of view, the timing marks on the timing disc are appropriately positioned on the timing disc to compensate for any nonlinearities in the rate of scan. The timing disc also enables the FLIR to remain fully operative even when there exist variations in the angular velocity of the counterrotating prisms causing an abnormal rate of scan of each field.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawing.

DETAILED DESCRIPTION OF THE PREFERRED EMBODIMENT

Figure 1:
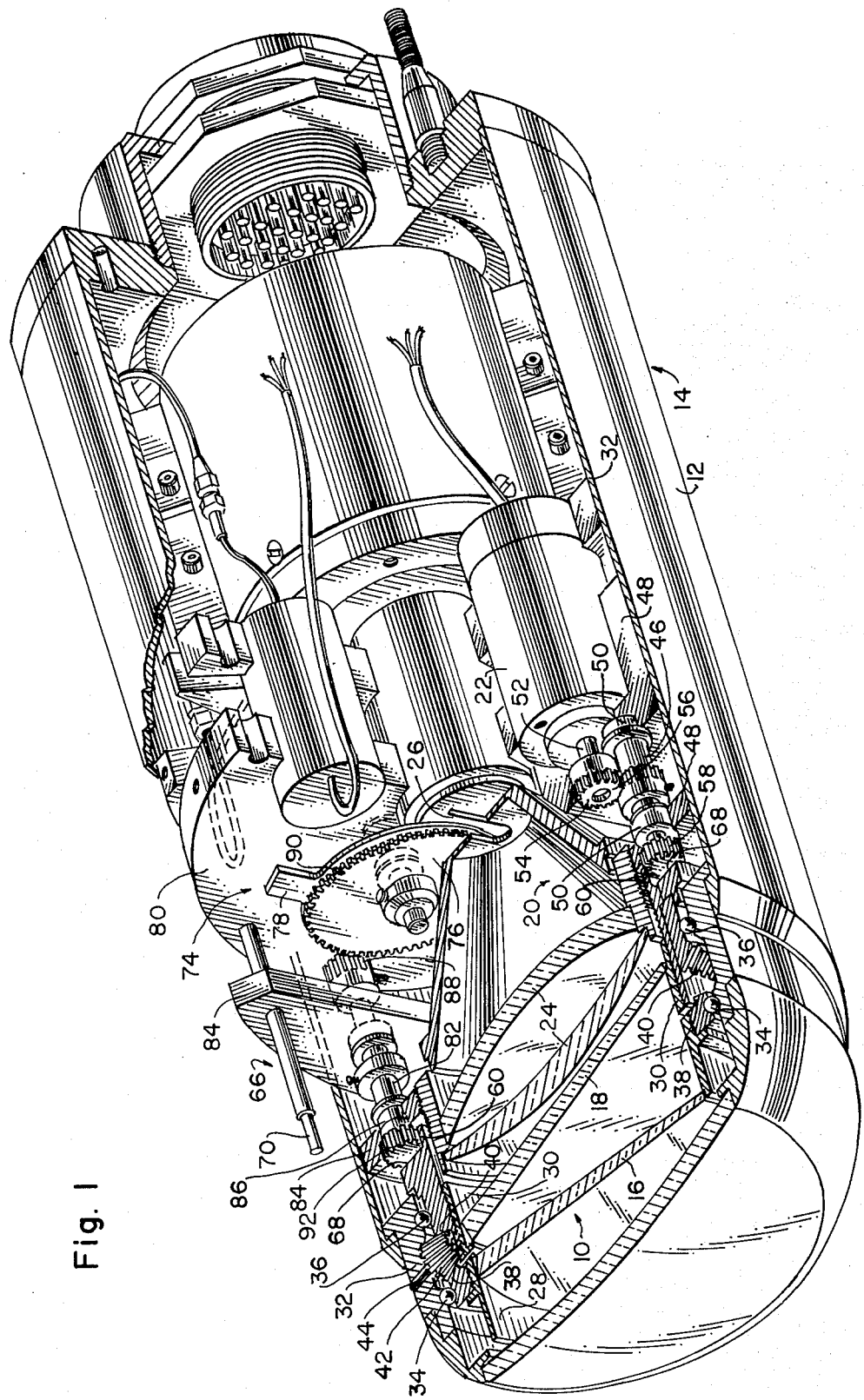
FIG. 1 is an isometric view of the scanning mechanism of the invention incorporated into the pod of a FLIR.

FIG. 1 is an isometric view of the scanning mechanism 10 of the invention incorporated within the pod 12 of a FLIR 14. The scanning mechanism 10 basically comprises a first and a second prism 16 and 18 which are operatively counterrotated with respect to one another by means of a drive train assembly 20 and motor 22. The counterrotating prisms 16 and 18 are positioned in front of the final image forming lens such as a pair of objective lenses 24 which focus the infrared radiation refracted through the prisms 16 and 18 onto the detector array 26.

More particularly, the first prism 16 and the second prism 18 are rigidly secured within a first retaining ring 28 and a second retaining ring 30, respectively. The two rings 28 and 30 are then respectively rotatably positioned within the shell 32 of the pod 12 by means of annular bearings 34 and 36. A first and second annular bevel gear 38 and 40 are integrally formed, in facing relationship, within the inner raceways of the bearings 34 and 36. One or more bevel miter gears 42 are rotatably journaled on a stub shaft 44 which extends from within the shell 32 of the pod 12 between the annular bevel gears 38 and 40. The miter gear 42 operatively engages the annular bevel gears 38 and 40 such that rotation of one of the retaining rings 28 or 30 will cause the other retaining ring 28 or 30 to rotate in the opposite direction.

The drive train assembly 20 comprises a drive shaft 46 which is rotatably secured within supports 48 extending from the inside of the shell 32 of the pod 12 by means of suitable bearings 50. The axis of rotation of the drive shaft 46 is positioned eccentric to the output shaft 52 of the motor 22. The output shaft 52 of the motor 22 drives (rotates) the drive shaft 46 by means of spur gears 54 and 56. The proximal end of the drive shaft 46 includes another spur gear 58 which engages an annular gear 60 connected about the second retaining ring 30.

It should be appreciated that upon operation of the motor 22, the drive train assembly 20 described above will precisely counterrotate the prisms 16 and 18 with respect to one another at identical angular velocities. Moreover, this precise counterrotation of the prisms 16 and 18 will persist irrespective of the speed of the output shaft 52 of the motor 22.

Figure 2:
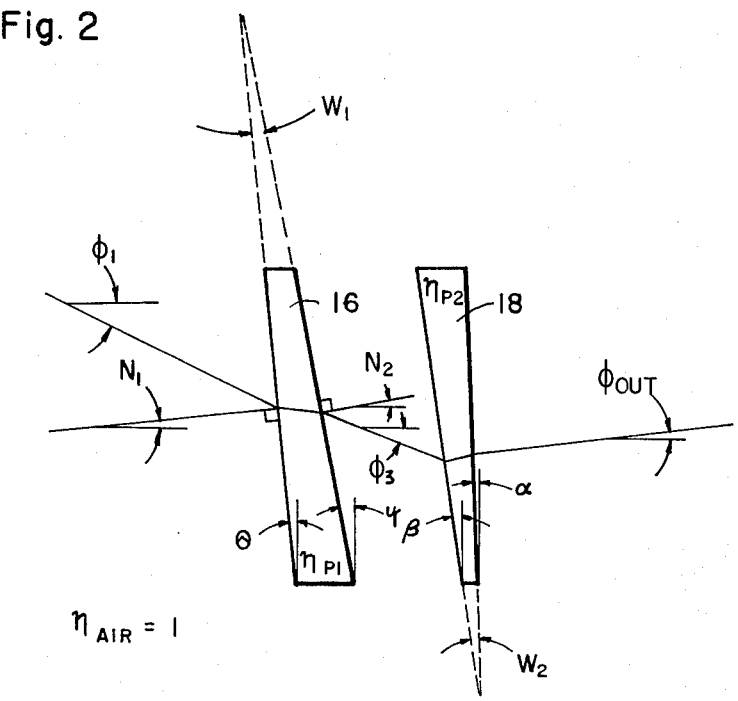
FIG. 2 is a diagrammatic view of the counterrotating prisms showing the refraction of the infrared radiation therethrough.
Figure 3:
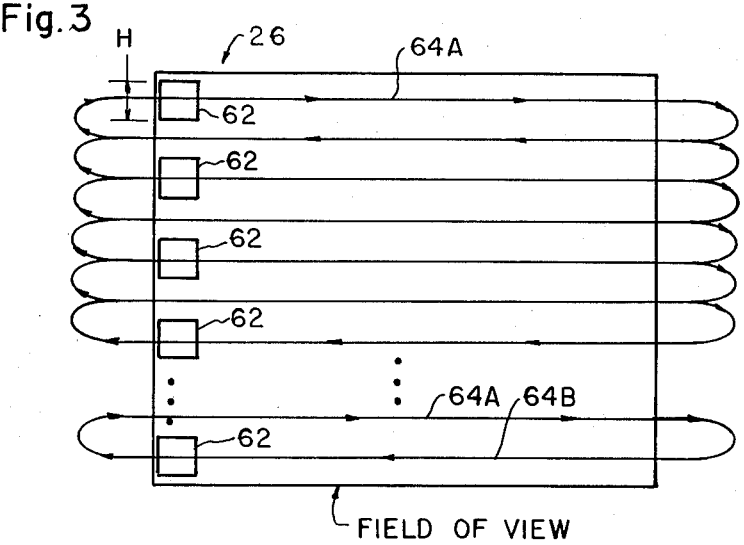
FIG. 3 is a diagrammatic view of the detector array illustrating the 2:1 interlacing elliptical pattern created by the counterrotating prisms enabling the detector array to completely and sequentially disect the thermal image.

As shown in FIG. 1, it can be seen that the two prisms 16 and 18 are tilted with respect to one another and with respect to the axis of the detector array 26. FIG. 2 is a diagrammatic view of the counterrotating prisms 16 and 18 illustrating the manner in which the counterrotating prisms 16 and 18 refract radiation from the thermal image for focusing on the detector array 26. The scan pattern produced by the counterrotating prisms 16 and 18 is a function of: (1) the angle of tilt of each of the prisms 16 and 18, (2) the prism angle of each prism 16 and 18, and (3) the index of refraction of each prism 16 and 18. The following equations set forth the precise relationship among the above factors, and thus may be used to compute a desired elliptical scan pattern by varying the values for the tilt angles, indices of refraction, and prism angles.

Referring to FIG. 2, the refraction through a single prism can be represented by:

$$\phi_3 = \arcsin[\eta_{p1} \sin[\arcsin[1/\eta_{p1} \sin[\phi_1 - N_1]] - W_1]] + N_2$$

where:
W is the wedge angle of the prism and
$\eta$ is the index of refraction of the prism.
For a scanner, let $\phi_1$ go to 0.0 (on axis scan), then $$\phi_3 = \arcsin[\eta_{p1} \sin[\arcsin[1/\eta_{p1} \sin[-N_1]] - N_1]] + N_2$$

With two prisms in series, $\phi_3$ from the first prism 16 becomes $\phi_1$ for the second prism 18 and $N_3$ and $N_4$ become the first and the second surface normals, respectively, of the second prism 18. Thus:

$$\phi_{out} = \arcsin[\eta_{p1} \sin[\arcsin[1/\eta_{p2} \sin[\phi_3 - N_3]] - W_2]] + N_4$$

where $\phi_3 = \arcsin[\eta_{p1} \sin[\arcsin[1/\eta_{P1} \sin[-N_1]] - W_1]] + N_2$ Examination of the above equation for $\phi_{out}$ reveals that as the prisms counterrotate out of their intial positions, the normals and the prisms take an X and Y component resulting in the output ray developing and X and Y component. It is this $\phi_x$ and $\phi_y$ which produces the scan.

From the foregoing formula, it should be appreciated that any elliptical scan pattern may be produced by the counterrotating prisms 16 and 18 through the proper selection of the tilt angles, the indices of refraction, and the wedge angle of each prism 16 and 18.

In the preferred embodiment of the invention, the elliptical scan pattern created by the counterrotating prisms 16 and 18 are combined with a specific detector array 26. More particularly, this specific embodiment of the detector array 26 comprises a column of stacked detector elements 62 which are spaced apart from one another by a distance equal to their height, represented by the letter "H". The tilt angles, the indices of refraction, and the wedge angles of the prisms 16 and 18 are selected to produce an elliptical scan pattern having two parallel lines 64a and 64b which are separated by the height of the individual detector elements 62 and which are substantially parallel with one another over the active portion of the elliptical scan. The thermal image is sequentially and completely dissected by the detector array 26 by a 2:1 interlacing format. Specifically, as the prisms 16 and 18 are counterrotated, the detector elements 62 scan across the thermal image along the first parallel line 64a to complete the first field of the frame. The detector elements 62 then scan across the thermal image along the second parallel line 64b to complete the second field of the frame.

In one very specific embodiment of the invention, the detector array 26 and the elliptical scan produced by the counterrotating prisms 16 and 18 may be characterized as follows: the detector array 26 includes 32 standard detector elements 62 with each detector element 62 having a 50 microns×50 microns size and being spced apart from adjoining detector elements by a distance equal to 50 microns. The faces of each of the prisms 16 and 18 are tilted with respect to the axis of the detector array 26 such that $\alpha = 2.0786°$; $\beta = 2.50$; $\theta = 7.91°$ and $\psi = 7.50°$ with $W_1 = \theta - \psi = 0.4100°$ and $W_2 = \beta - \alpha = 0.4214°$. As can be seen, the wedge angle of the prisms 16 and 18 varies by $0.0114° = 4.104''$ (arc-seconds). It is this precise variation in prism wedge angles and tilts that provide the precise elliptical scan which meets the criteria imposed by:

| | | |
|---|---|---|
| (a) | element size | 50 microns × 50 microns |
| (b) | element spacing | 100 microns center to center |
| (c) | total field of view | 38.4 milliradians vertical × 48 milliradians horizontal |
| (d) | instantaneous field of view | 0.6 milliradians vertical 0.6 milliradians horizontal |

It should be appreciated that the above scanner mechanism 10 of the invention is a substantial improvement over all of the prior art scanning mechanisms. Specifically, a major advantage of the subject invention is the fact that no component thereof moves in any type of an oscillatory manner. Rather, the prisms 16 and 18 counterrotate in a smooth and continuous rotary motion which completely eliminates mechanical jitter, substantially reduces microphonics, and results in a significantly more rugged scanning mechanism, the performance of which is completely unaffected by use in actual working conditions.

Another major advantage of the scanner mechanism 10 of the invention is the elimination of narcissus effect. This is due to the fact that the second prism 18 is tilted off axis with respect to the axis of the detector array 26 thereby preventing any reflections from the detector array 26 from reflecting off the backside of the second prism 18.

Figure 4:
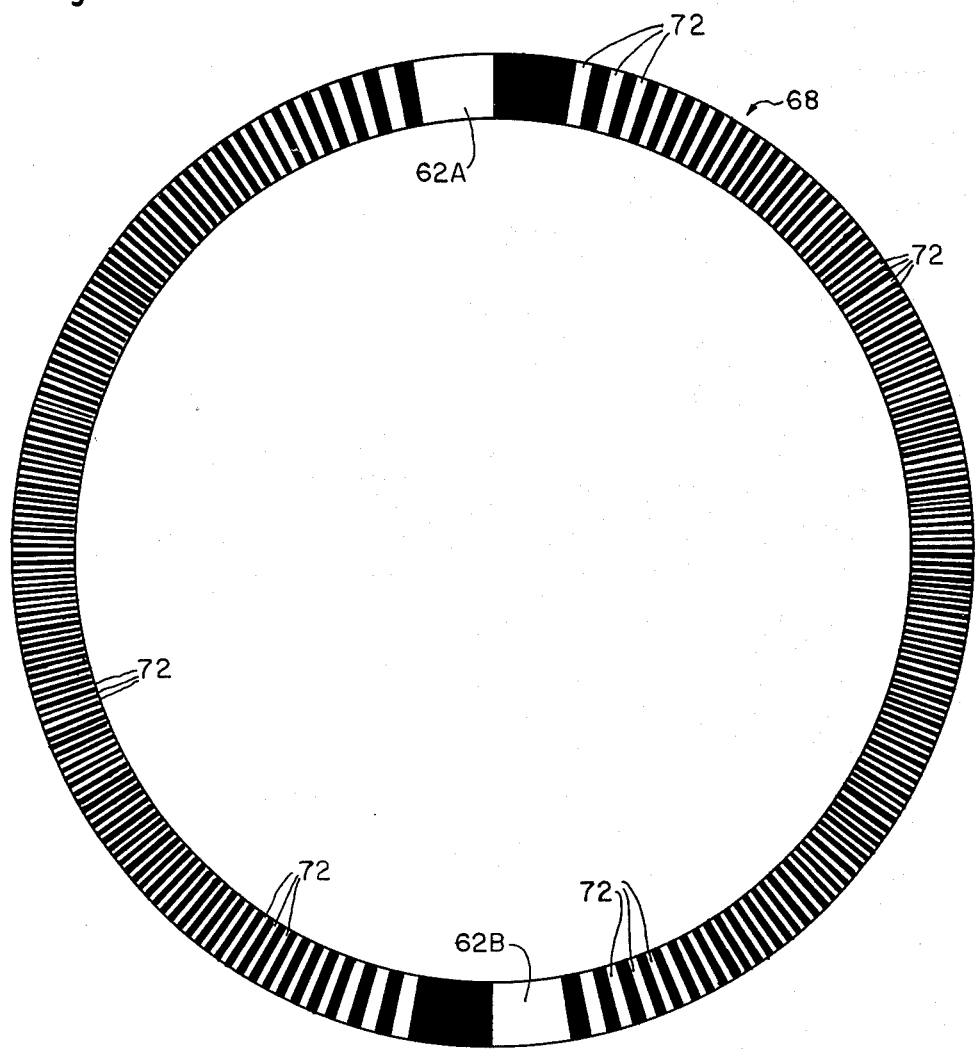
FIG. 4 is a plan view of the timing disc showing the placement of the timing marks thereon.

From the above equations, it should be apparent that the rate of scan across each field of the frame is not linear, but rather is a portion of a sinusoid. In order to provide a uniform rate of scan across each field of the thermal image, a means for compensating for such non-linearities must be provided. As shown in FIG. 1, the scan rate compensator 66 comprises a timing disc 68 whose rotational position is sensed by a transducer 70. In the preferred embodiment, the timing disc 68 comprises an annular configuration which is connected about the second retaining ring 30. Referring to FIG. 4, a plurality of timing marks 72 are positioned about the face of the timing disc 68. The timing marks 72 are approximately spaced along the timing disc 68 at distances apart from one another which are proportional to the nonlinear rate of scan produced by the counterrotating prisms 16 and 18. The transducer 70 preferably comprises an optically sensitive device which senses the passing of each timing mark 72 and triggers the sampling electronics which parallel sample all of the detector elements 62. A pair of synchronization timing marks 62A and 62B are positioned on the timing disc 68 to signal completion of each field of each frame. Preferably, the width of the synchronization timing marks 62A and 62B is proportional to the length of the inactive (turnaround) portion of the elliptical scan.

It should be appeciated that the scan rate compensator 66 compensates for any nonlinearities in the rate of scan of each field. Moreover, the scan rate compensator 66 assures that the detector elements 62 will be uniformly sampled across each field independent of the angular velocity of the counterrotating prisms 16 and 18. Thus, the FLIR remains fully operational even when there exist variations in the angular velocity of the output of the drive motor 22.

Returning to FIG. 1, a final feature of the scanning mechanism 10 of the invention is the incorporation of a mechanical d.c. restoration device 74 into the pod 12 of the FLIR 14. The d.c. restorator 74 comprises a disc 76 having a flange 78 extending radially outward therefrom. The disc 76 is rotatably journaled within a support 80 extending from the shell 32 of the pod 12. The axis of rotation of the disc 76 is positioned offset from the axis of the detector array 26 such that the flange 78 blocks the radiation from the thermal image onto the detector array 26 upon each rotation of the disc 76. The disc 76 is rotated by means of an idler axle 82 rotatably positioned within support 84 extending from the shell 32 of the pod 12 by means of bearings 86. A spur gear 88 is connected to the distal end of the idler axle 82 for engagement with an annular gear 90 positioned adjacent to the front surface of the disc 76. A similar spur gear 92 is connected to the proximal end of the idler axle 82 for engagement with the annular gear 60 connected about the second retaining ring 30. During use, rotation of the second retaining ring 30 rotates the idler axle 82 which in turn rotates the disc 76 by virtue of the annular gear 90 and spur gear 88 combination. The relative diameters of each of the gears 88, 90, and 92 are selected such that the disc 76 makes two complete revolutions per one revolution of the second retaining ring 30 (and correspondingly, per revolution of the prisms 16 and 18). Further, the flange 78 of the disc 76 is aligned with the elliptical scan pattern created by the counterrotating prisms 16 and 18 such that the flange 78 is immediately in front of the detector array 26 only during the inactive (turnaround) portion of the elliptical scan.

It should be appreciated that the d.c. restorator 74 of the invention functions to set the d.c. level of the output of the detector array 26. More particularly, with the flange 78 being painted black, the flange 78 will function as an almost ideal black body which, when subjected to ambient weather conditions, may be used to set a suitable d.c. level of the output of the detector array 26. Of course, the restoration of the d.c. level must be accomplished during the inactive portion of the elliptical scan such that the flange 78 will not interfere with the disection of the thermal image by the detector array 26 and the resultant sampling of the detector array 26.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. A scanning mechanism for scanning an image onto a detector array, comprising in combination:
   a first prism having a first wedge angle and a first index of refraction;
   a second prism having a second wedge angle and a second index of refraction and positioned behind said first prism;
   said second prism being tilted with respect to the axis of the detector array by a predetermined tilt angle;
   the tilt angle of said second prism and the indices of refraction and the wedge angles of each said prisms being selected to produce an elliptical pattern having a substantially flat configuration with two parallel lines which remain substantially parallel over the majority of the length of said elliptical pattern;
   the detector array including a column of stacked detector elements of uniform height with each detector element being spaced apart from one another by a distance equal to the height of the detector elements;
   said parallel lines of said elliptical pattern being separated by a distance equal to the height of the detector elements; and
   means for counterrotating said prisms whereby the image is scanned in an elliptical pattern onto the detector array by a 2:1 interlacing technique.

2. The scanning mechanism as set forth in claim 1, wherein said means for counterrotating said prisms comprises in combination:
   a first annular bevel gear connected relative to said first prism;
   a second annular bevel gear connected relative to said second prism;
   a bevel miter gear rotatably journaled between said first annular bevel gear and said second annular bevel gear for engagement therewith;
   motor means; and
   means for operatively connecting said motor means to one of said prisms whereby rotation of one of said prisms in one direction will rotate the other of said prisms in the opposite direction.

3. The scanning mechanism as set forth in claim 1, further including a converging optic positioned between said second prism and the detector array for focusing the refracted radiation from said prisms onto the detector array.

4. The scanning mechanism as set forth in claim 1, further including a means for compensating for nonlinearities produced in the scan rate during the counterrotating of said prisms to enable uniform sampling of the detector array during the scanning of each field of the frame of the image.

5. The scanning mechanism as set forth in claim 4, wherein said compensating means comprises a timing disc connected to one of said prisms and a transducer for sensing the relative angular position of said timing disc and for triggering the sampling of the detector array in proportion to the nonlinearity of the scan rate.

6. The scanning mechanism as set forth in claim 1, further comprising a mechanical d.c. restorator for setting the d.c. level of the output of the detector array.

7. The scanning mechanism as set forth in claim 6, wherein said d.c. restorator comprises in combination:
   a disc including a flange extending radially therefrom;
   means for rotatably connecting said disc in a position offset from the axis of said detector array such that only said flange blocks the radiation from the image onto the detector array;

means for rotating said disc such that such disc completes two revolutions per each revolution of said prisms; and means for aligning said disc with said prisms such that said flange is in a blocking position in front of the detector array only during the inactive portion of the elliptical scan produced by the counterrotating of said prisms.

8. The scanning mechanism as set forth in claim 7, wherein said rotating means and said aligning means comprise an idler shaft which operatively connects said disc to one of said prisms whereby rotation of said prism rotates said idler shaft which in turn rotates said disc two revolutions per revolution of said prism and whereby said flange is positioned in front of the detector array during the inactive portion of the elliptical scan produced by the counter-rotating of said prisms.

9. A method for scanning an image onto a detector array having a plurality of detector elements of uniform height which are spaced apart from one another by a distance equal to the height of the detector elements, comprising the steps of:

positioning a first and a second prism serially in front of the detector array;

tilting said prisms with respect to one another; and counterrotating said prisms whereby the image is scanned in an elliptical pattern onto the detector array by a 2:1 interlacing technique.

10. A method for scanning an image onto a rectilinear detector array having a plurality of detector elements of uniform height which are spaced apart from one another by a distance equal to the height of the detector elements, comprising counterrotating a first prism having a wedge angle bisected by a bisector and a second prism having a wedge angle bisected by a bisector, positioned serially in front of the detector array, characterized by tilting the bisector of said first prism with respect to the bisector of said second prism by such an amount that an elliptical scan pattern is created by the counterrotating prisms, with the elliptical scan pattern including two substantially parallel lines which are spaced apart from one another by a distance equal to the height of the detector elements such that the detector array dissects the thermal image in a 2:1 interlacing technique.

* * * * *